US012792752B2

(12) United States Patent
Fields et al.

(10) Patent No.: US 12,792,752 B2
(45) Date of Patent: Nov. 10, 2026

(54) SECRET SCANNER

(71) Applicant: The Travelers Indemnity Company, Hartford, CT (US)

(72) Inventors: David M. Fields, East Hampton, CT (US); Sudharani Acharya, South Windsor, CT (US); Thomas J. Chinthu, Bethlehem, PA (US); Dylan S. LaPierre, Torrington, CT (US); Collin W. Klug, Inver Grove Heights, MN (US); Joseph A. Zott, Hartford, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 80 days.

(21) Appl. No.: 18/888,564

(22) Filed: Sep. 18, 2024

(65) Prior Publication Data

US 2026/0080077 A1 Mar. 19, 2026

(51) Int. Cl.
*G06F 21/60* (2013.01)
*G06F 21/31* (2013.01)

(52) U.S. Cl.
CPC ............ *G06F 21/604* (2013.01); *G06F 21/31* (2013.01)

(58) Field of Classification Search
USPC ........................................................... 726/26
See application file for complete search history.

(56) References Cited

U.S. PATENT DOCUMENTS

| | | | | |
|---|---|---|---|---|
| 10,091,190 | B2 * | 10/2018 | Camenisch | G06F 21/604 |
| 12,047,340 | B2 * | 7/2024 | Tee | G06F 18/23213 |
| 2023/0401332 | A1 * | 12/2023 | Vahidnia | H04L 63/101 |
| 2024/0134946 | A1 * | 4/2024 | Lonas, Jr. | G06N 5/022 |

FOREIGN PATENT DOCUMENTS

| | | | | |
|---|---|---|---|---|
| EP | 4614360 A1 * | 9/2025 | | G06F 21/577 |
| WO | WO-2025212117 A1 * | 10/2025 | | H04L 9/50 |

* cited by examiner

*Primary Examiner* — Sakinah White-Taylor
(74) *Attorney, Agent, or Firm* — CANTOR COLBURN LLP

(57) ABSTRACT

A system includes an application programming interface, a plurality of memory resources, and a plurality of processor resources configured to access the memory resources and execute a plurality of instructions to perform a plurality of operations. The application programming interface is configured to receive a plurality of data from one or more data source. The operations include parsing the data to extract a plurality of character strings as a plurality of tokens, determining a secret likelihood score of each of the tokens, and classifying the tokens based on the secret likelihood score. The tokens are sent to different secret analyzers based on the classifying to confirm an identified secret or a likely secret. A notification is sent to one or more user systems based on confirmation of the identified secret or the likely secret.

26 Claims, 9 Drawing Sheets

SECRET SCANNER

BACKGROUND

In developing software, code repositories can be used as a starting point for new applications through reusing previously developed code. Code written in high-level programming languages can include various types of embedded information, such as comments that explain the code design and/or related information to support understanding of code functionality as well as how to interface with the code through various inputs and outputs. Data values used by the code may also be embedded within the code as variables or constants. Data files may also be accessed by the code during execution such that data used by the code can reside in various locations. Some code libraries may incorporate a large quantity of code, which can be available for use but may not be executed. Code that interfaces with other systems during execution may pass security or identification credentials to establish and maintain communication. Further, sensitive data may be encoded or encrypted to make the data difficult to access and interpret. In some cases, code or data files may include information that is intended to be secret information. Moreover, secret information may be captured in various types of unstructured text, such as email messages, text messages, documents, and other such files. Inadvertent sharing of secret information can expose security threats by allowing unauthorized users or systems to use the secret information for accessing secure systems.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

DETAILED DESCRIPTION

According to an embodiment, a system for secret scanning is provided. The system may be used for various practical applications of computer system security. Embodiments allow a user to identify potential secret information that can be embedded within text. Embodiments can also allow users to choose whom should be notified if a secret is identified. Text data can be input directly by a user as input to a secret scanner as further described herein. Alternatively, one or more files can be passed to the secret scanner for inspection to determine whether one or more values within the files appear to include secret information. Secret likelihood scoring can be used to trigger invocation of one or more models or processes to more precisely classify potential secrets. Models can be trained to distinguish between potential secrets that may be deemed insignificant or significant. For example, an insignificant secret may be a public encryption key that may be generally available but not useful without a corresponding private key, where the private key would be a significant secret. As a further example, a user identifier may be an insignificant secret (e.g., an email address), while a password to access a secure system may be a significant secret.

Splitting up processing as a coarse analysis for likely secrets can reduce the initial processing burden by using less computationally intensive processes to filter possible secrets from text that is unlikely to be a secret. Text exhibiting a substantially high likelihood of being a secret can be analyzed further by a process that is designed or trained to confirm potential secrets using a different process than may be used for text exhibiting a lower likelihood of being a secret. This can reduce the consumption of computational resources to avoid executing more complex models for high likelihood and very low likelihood cases, for example. By tuning performance of secret detection models to separately process higher and lower likelihood data, each model can more efficiently handle a subset of possible conditions. For example, thresholds can be defined to determine whether text has a high likelihood of being a secret (e.g., secret likelihood score above an upper threshold), a medium likelihood of being a secret (e.g., secret likelihood score below the upper threshold and above a lower threshold), a lower likelihood of being a secret (e.g., secret likelihood score below the lower threshold and above a minimum threshold), or not a secret (e.g., a secret likelihood score below the minimum threshold). For each of these potential conditions, different processing actions can be triggered. In contrast, if a full secret scanner analysis was performed on each token of a file, the processing burden would be substantially increased, which may result in greater memory consumption and/or network traffic as well.

Figure 1:
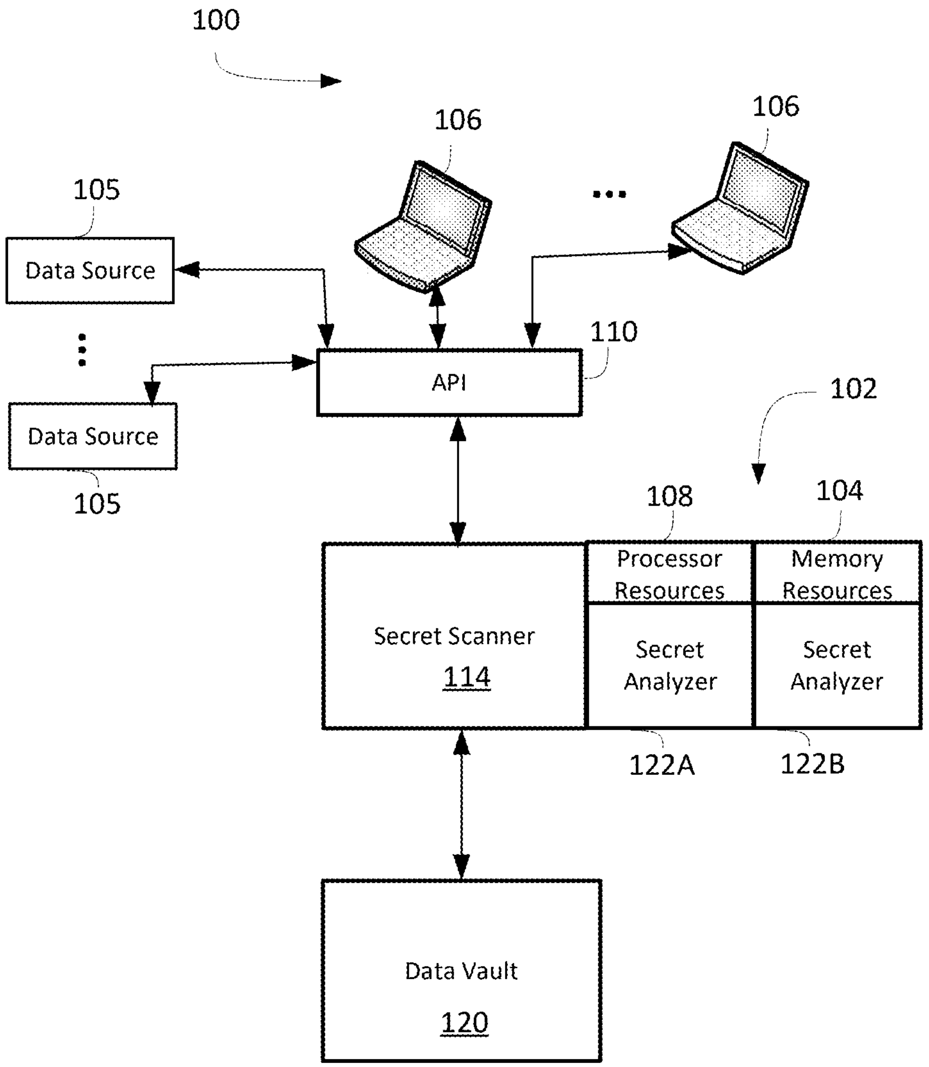
FIG. 1 depicts a block diagram of a system according to some embodiments of the present invention.

Turning now to FIG. 1, a system 100 is depicted upon which secret scanning may be implemented. The system 100 can include computing resources 102 accessible by one or more data sources 105 and one or more user systems 106. The computing resources 102 can include one or more servers or a cloud-based environment in a serverless architecture, for instance, where resources are provisioned for use as needed. The computing resources 102 can include, for example, a plurality of memory resources 104 and a plurality of processor resources 108 configured to access the memory resources 104 and execute a plurality of instructions to perform a plurality of operations. Memory resources 104 can include a memory device, also referred to herein as "computer-readable memory" (e.g., non-transitory memory devices, as opposed to transmission devices or media), and may generally store program instructions, code, and/or modules that, when executed by the processor resources 108 (e.g., processing devices), cause a particular machine to function in accordance with one or more embodiments described herein. The memory resources 104 and processor resources 108 can be scalable to match the computing demands. The user systems 106 may each be implemented using a computer executing one or more computer programs for carrying out portions of processes described herein. In one embodiment, the user systems 106 may each comprise a personal computer (e.g., a laptop, desktop, etc.), a network server-attached terminal (e.g., a thin client operating within a network), or a portable device (e.g., a tablet computer, personal digital assistant, smart phone, etc.).

The data sources 105 can include one or more of: a code repository, a database, a registry, and a cloud object storage service. The data sources 105 and/or user systems 106 can interface through an application programming interface (API) 110 to access a secret scanner 114, for instance, through a network. The secret scanner 114 can be executed using the computing resources 102. The secret scanner 114 can also interface with a data vault 120 that stores secured files and data. Commands can be passed through the API 110 without the use of a graphical user interface (GUI) or users may be provided with a GUI to manually control and view various analysis aspects of the secret scanner 114. The secret scanner 114 can be executed by the computing resources 102 and/or may be distributed to perform portions of processing on various computing platforms. The secret scanner 114 can invoke one or more secret analyzers 122A, 122B to perform different types of analysis. For instance, the secret scanner 114 may perform initial processing of input data to tokenize the input and determine secret likelihood scores. For tokens having a secret likelihood score above an upper threshold, the secret scanner 114 may pass those tokens to the secret analyzer 122A, while tokens having a secret likelihood score below the upper threshold and above a lower threshold may be passed to the secret analyzer 122B, for example. Different models or processing rules may be applied by the secret analyzers 122A, 122B. Partitioning the processing can result in a faster response time on average by tuning each of the secret analyzers 122A, 122B to specific types of analysis. For instance, a higher degree of uncertainty can lead to additional comparisons or analysis that may be unnecessary for tokens that exhibit a higher likelihood of being a secret. Further, the secret analyzers 122A, 122B can support parallel processing, where each of the secret analyzers 122A, 122B works on separate batches of tokens to improve overall system responsiveness.

In some embodiments, the data vault 120 can establish storage and retrieval constraints for stored content. Searches of the data vault 120 can be limited to cases where tokens exhibit a sufficient likelihood of being a secret, as confirmed by the secret analyzers 122A, 122B, for example. Where secrets are identified as being stored within the data vault 120, the secret scanner 114 can confirm that a token is likely a secret and indicate where the secret appears within the data vault 120. Notification can be transmitted to one of the user systems 106. As a further example, where the data source 105 is a file or database, identification of a likely secret within the data source 105, where the secret is also found in the data vault 120, can trigger a further action to remove the secret from the data vault 120. For instance, if code from a code library as one of the data sources 105 included a secret, and the secret was inadvertently copied into the data vault 120, an owner of the content stored in the data vault 120 can be notified to remove or edit the secret stored in the data vault 120 to avoid exposing the secret to others.

Although the example of FIG. 1 depicts one configuration of system 100, it will be understood that many other configurations are contemplated. For instance, there can be a greater or lesser number of system elements beyond those depicted in the example of FIG. 1.

Figure 2:
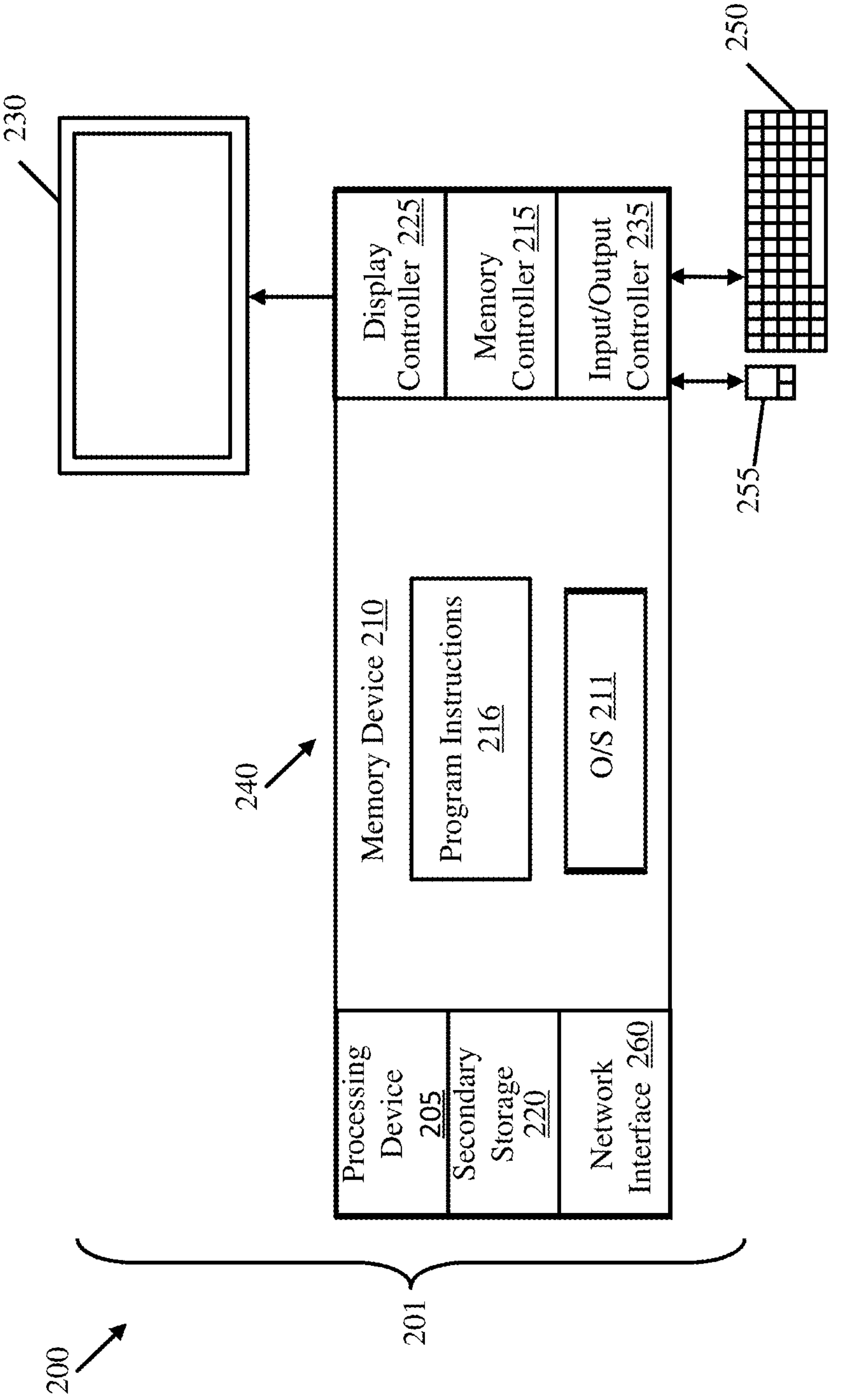
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the user systems 106 and/or a portion of computing resources 102 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion-sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium upon which instructions executable by the processing device 205 may be embodied as a computer program product. The memory device 210 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the secret scanner 114 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in one of the user systems 106, the network interface 260 can establish communication channels with the computing resources 102 of FIG. 1.

Figure 3:
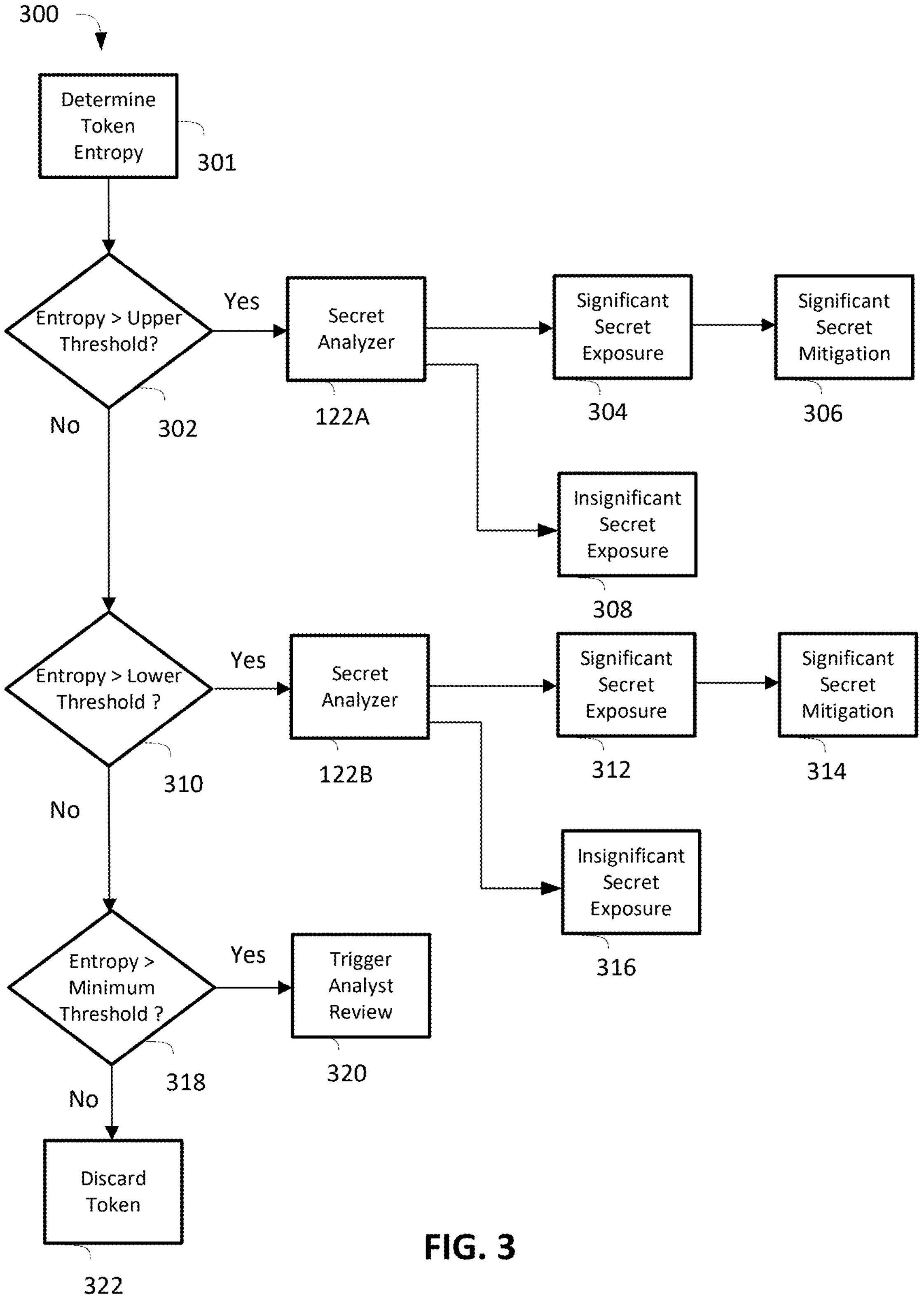
FIG. 3 depicts an example of a process of token entropy analysis according to some embodiments of the present invention.

FIG. 3 depicts an example of a process 300 of token entropy analysis according to some embodiments. The process 300 can be performed by the secret scanner 114 of FIG. 1. At block 301, text can be parsed into tokens and entropy of the tokens can be determined. For instance, the text can be passed from the one or more data sources 105 of FIG. 1 or the user systems 106 of FIG. 1. Tokenization can parse text, where a token can include a word or phrase of characters (e.g., a sequential combination of letters, numbers, and/or special characters). Various approaches can be used to tokenize data, such as spaces, punctuation, line breaks, and grouping or splitting of text. In some embodiments, machine learning, such as a natural language parser can be used. Where the data to be analyzed aligns to formatting rules, such as a programming language file, a compiler-parser can identify tokens according to rules of the programming language. Where the text is free-form text, machine learning can be used to sort text into bins that define likely tokenization patterns based on training data. Entropy can indicate randomness of characters within a token. Patterns that more closely match known words or character sequences may have a lower entropy, while character sequences exhibiting a greater deviation from known words or character sequences may have a higher entropy. Entropy scores can be scaled, for example, between 0 and 1 as examples of low/minimum entropy and high/maximum entropy.

At block 302, the entropy score can be compared to an upper threshold, indicating a higher likelihood of including a secret. For example, the upper threshold can be 0.8. Upon identifying a token having an entropy score above the upper threshold, the token can be sent to secret analyzer 122A (e.g., a first secret analyzer). The secret analyzer 122A can be a first large language model trained based on a first training data subset to group secrets as significant secret exposure 304 and insignificant secret exposure 308. The secret analyzer 122A can trigger a scan of the data vault 120 to confirm an identified secret. A secret classified by the secret analyzer 122A as a significant secret exposure 304 can result in capturing information about the secret, such as a position within the input data of the secret and location of the secret within the data vault 120. A significant secret mitigation 306 can include sending a notification of the secret, location information, and entropy score (e.g., a probability score) to a designated system, such as one of the user systems 106 of FIG. 1. A user may determine whether the secret should be removed or modified in the data source 105 and/or in the data vault 120 to prevent unintended or unauthorized sharing of the secret. Further, an automated removal/modification determination, e.g., for high-volume scans not involving user input, can be implemented in some embodiments. An insignificant secret exposure 308 may log the occurrence of the secret as located during scanning but may not prompt any specific user actions or system actions. Log files can be available to audit the performance of detection and classification of secrets to determine if any adjustments or updated training is needed.

At block 310, the entropy score can be compared to a lower threshold, indicating a lower likelihood of including a secret. For example, the lower threshold can be 0.6. Upon identifying a token having an entropy score above the lower threshold, the token can be sent to secret analyzer 122B (e.g., a second secret analyzer). The secret analyzer 122B can be a second large language model trained based on a second training data subset to group secrets as significant secret exposure 312 and insignificant secret exposure 316. The secret analyzer 122B can trigger a pattern check of a plurality of known patterns of secrets to confirm a likely secret. The secret analyzer 122B may also trigger a scan of the data vault 120 to confirm the likely secret. For instance, a pattern match can confirm that a likely secret matches a known pattern that increases the likelihood of being a secret, and scanning of the data vault 120 can confirm use of the likely secret. A secret classified by the secret analyzer 122B as a significant secret exposure 312 can result in capturing information about the secret, such as a position within the input data of the secret and location of the secret within the data vault 120. A significant secret mitigation 314 can include sending a notification of the secret, location information, and entropy score (e.g., a probability score) to a designated system, such as one of the user systems 106 of FIG. 1. A user may determine whether the secret should be removed or modified in the data source 105 and/or in the data vault 120 to prevent unintended or unauthorized sharing of the secret. An insignificant secret exposure 316 may log the occurrence of the secret as located during scanning but may not prompt any specific user actions or system actions. Further, an automated removal/modification determination, e.g., for high-volume scans not involving user input, can be implemented in some embodiments. Log files can be available to audit the performance of detection and classification of secrets to determine if any adjustments or updated training is needed.

At block 318, the entropy score can be compared to a minimum threshold, indicating a lowest likelihood of including a secret. For example, the minimum threshold can be 0.3. Upon identifying a token having an entropy score above the minimum threshold, the token may trigger an analyst review 320 (e.g., a third secret analyzer). For instance, information about the token, such as a label, value, entropy score (e.g., probability score), and location information can be sent to a user system. In some embodiments, a text snippet around the token can be included to assist in understanding the context of the token relative to other test. The analyst may trigger a search of the data vault 120 for the token as part of the analysis process.

If a token has an entropy score that is below the minimum threshold at block 318, the token can be discarded at block 322. This prevents triggering of more complex analysis steps of the secret analyzer 122A, 122B where it is deemed unlikely that the token is a secret value.

Although one example is depicted in FIG. 3, it will be understood that many process variations are possible. For example, there can be multiple thresholds and secret analyzers. Further, the threshold values can be adjusted depending on performance, such as processor and memory utilization, as well as false positive rate.

Figure 4:
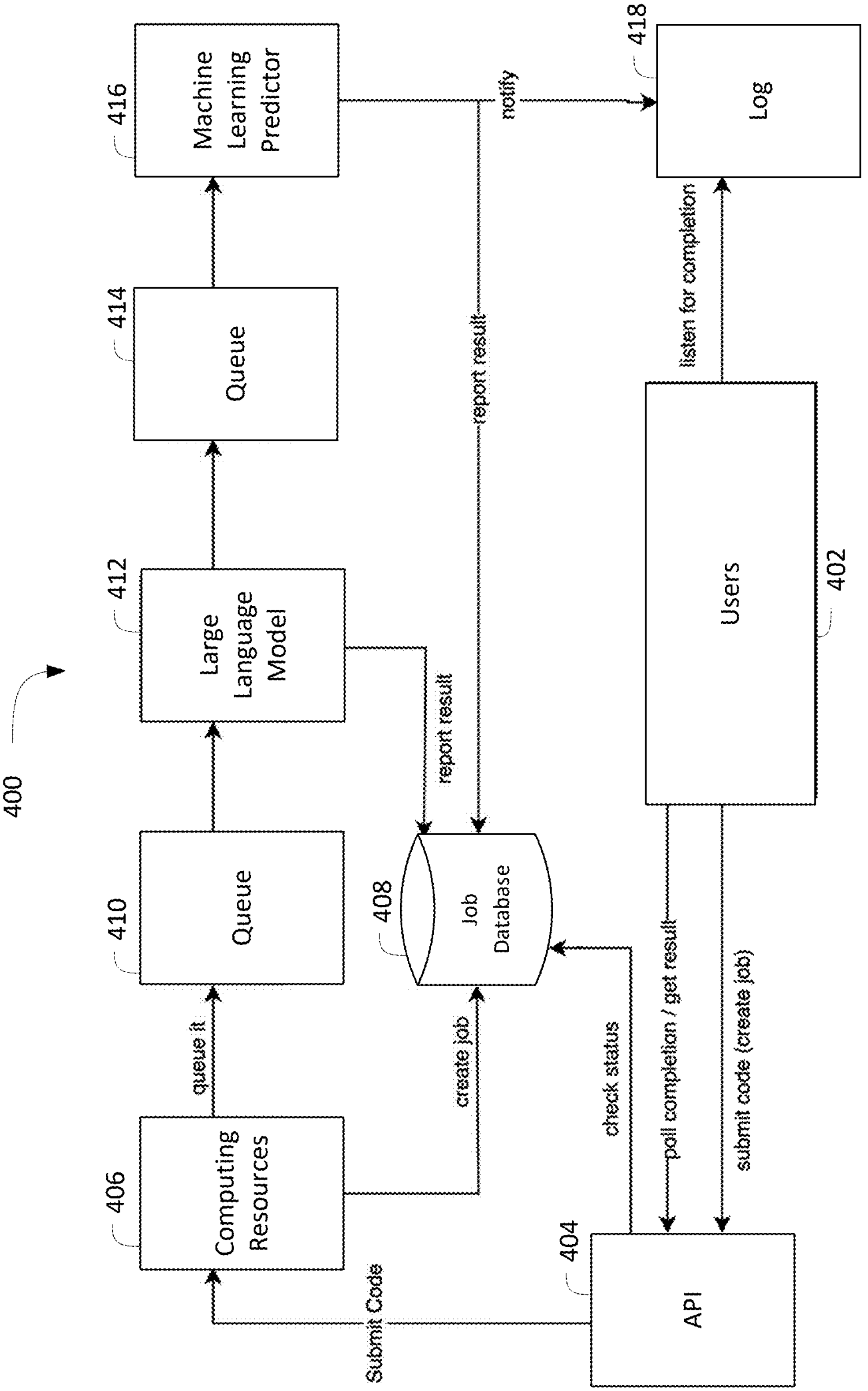
FIG. 4 depicts an example of a process for secret identification according to some embodiments of the present invention.

FIG. 4 depicts an example of a process 400 for secret identification according to some embodiments. The process 400 can be performed using the system 100 of FIG. 1. Further, the process 400 can be a serverless environment, where cloud-based resources are provisioned and released on demand. Users 402 can be data sources 105 and/or user systems 106 of FIG. 1. The users 402 can create a job by submitting code or other text to API 404, which is an example of API 110 of FIG. 1. The API 404 can submit code or other text data received to computing resources 406, such as computing resources 102 of FIG. 1, as part of a job submission. A job can be created in a job database 408 to synchronize processing with other components. The job can be queued in a queue 410, where a large language model 412 or other such machine learning model can extract a possible secret from the code or text submitted. For example, the large language model 412 can be trained to parse the code or text and identify tokens that could be a secret, such as a key, a token, an identifier, a password abbreviation, or other such content. Output of possible secrets can be reported to the job database 408 and queued in a queue 414. The queue 414 can provide tokens of possible secrets to a machine learning predictor 416 that can be trained to further identify whether possible secrets are more likely to be significant secrets, insignificant secrets, or not secrets. Results of classifications identified by the machine learning predictor 416 can be reported to the job database 408 and sent to a log 418, for example, using an event processing system. The users 402 can poll the API 404 during processing, which can trigger a status check of the job database 408 to determine whether processing has completed and get results. The users 402 can also monitor the log 418 for a notification of completion.

Although one example is depicted in FIG. 4, it will be understood that many process variations are possible. For example, the large language model 412 may only analyze a filtered subset of the code or text to reduce the amount of processing performed by the large language model 412.

Figure 5:
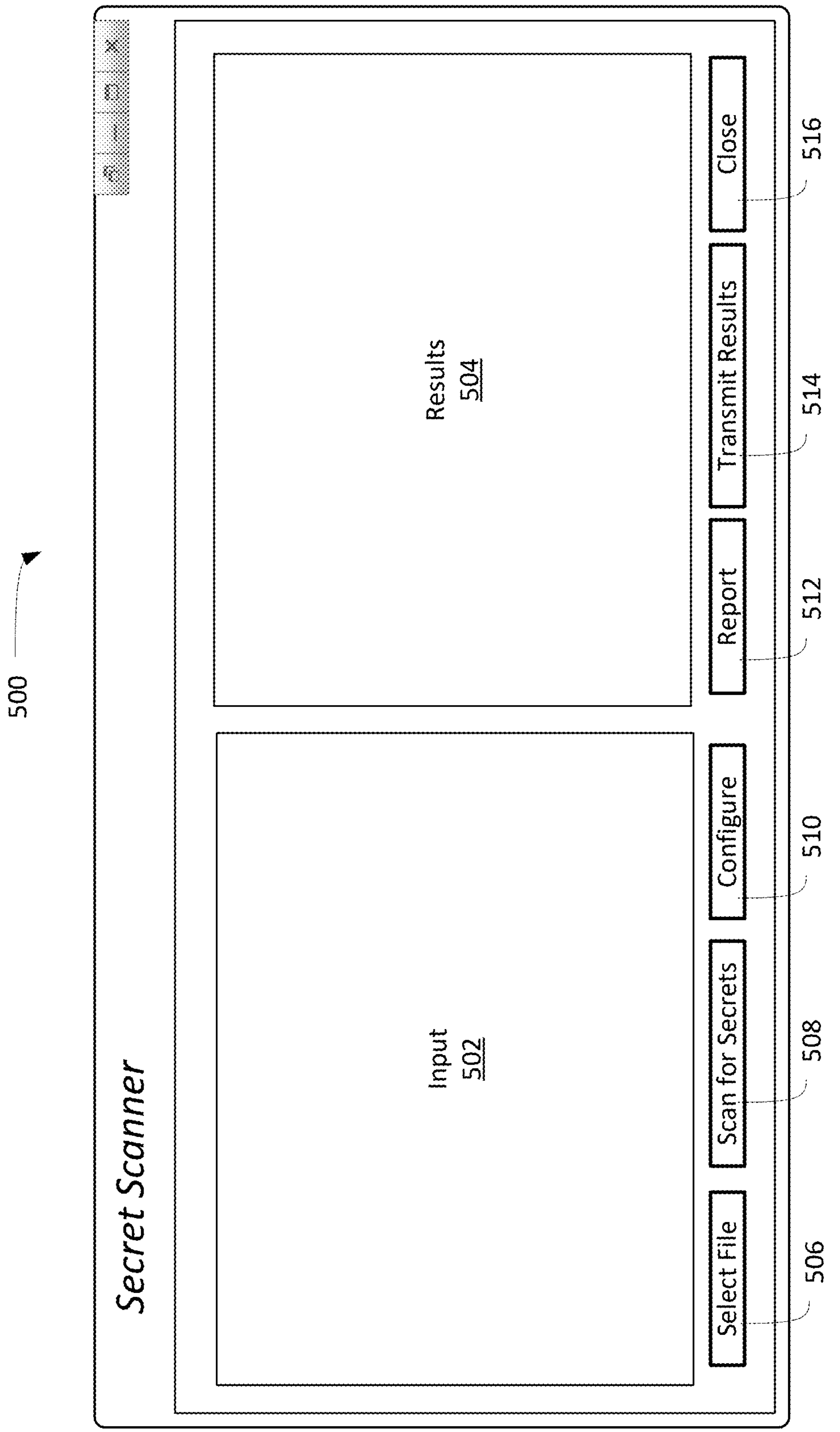
FIG. 5 depicts an example of a user interface for a secret scanner according to some embodiments of the present invention.

FIG. 5 depicts an example of a user interface 500 for a secret scanner according to some embodiments. In the example of FIG. 5, the user interface 500 includes an input region 502 and an output region 504. The user interface 500 need not display both the input region 502 and the output region 504 together as depicted. User selectable inputs can include virtual buttons for file selection 506, scan for secrets 508, configure 510, report 512, transmit results 514, and close 516, in this example. The input region 502 may accept direct typing of text or copy/paste of text. The file selection 506 can select one or more files (e.g., from data sources 105 of FIG. 1) to use as input rather than direct text entry in the input region 502. Selecting the scan for secrets 508 button can trigger the secret scanner 114 of FIG. 1 to analyze the selected files or contents of the input region 502 depending on which input source has been used. The configure 510 button can allow selection of features, such as where reports and logs should be stored, identify where to send notifications, adjust threshold values, select alternate machine learning models, and other such items. Secret scanning can be performed on-demand or on a continuous/scheduled basis. For example, full access can be provided to a portal or platform to perform periodic large-scale scans of enterprise systems. Such scans may cover terabytes of data, where such large-scale scanning could not reasonably be performed by humans as the underlying data may change before a human could complete a manual scanning effort. Various repositories of interest may be tagged, for instance, to identify developer data and establish pipelines of accesses and updates of underlying content that may include secrets. Where the user interface 500 is used to establish such scans, various parameters may be set through the configure 510 button, such as providing connection parameters, time periods, transaction sequences, and other such parameters. Further, secret scanning can be triggered upon actions, such as a push transaction or a pull transaction, upon content creation, and other such actions. For instance, secret scanning can be used to inspect auto-generated code, such as code produced by generative artificial intelligence, upon placing auto-generated code into a monitored repository.

In embodiments, upon the secret scanner 114 analyzing the data, results may be displayed in the output region 504. For instance, the output region 504 may highlight portions of the data provided as input to illustrate the context of identified secrets. The report 512 button may generate a summary of identified secrets, which can include keys, such as variable names, values of identified secrets, and associated probabilities of the values being secrets. Further, the summary may identify locations in the data where the secrets were found and locations in the data vault 120 of FIG. 1 where the secrets were found, if searching was performed. The transmit results 514 button can trigger a notification to one or more user systems 106 based on confirmation of an identified secret or a likely secret. The use of the transmit results 514 button can allow users to determine whether the results appear accurate before sending a notification. Alternatively, the notifications can be configured to be sent automatically without requiring use of the transmit results 514 button. The close 516 button may close the user interface 500. In embodiments, the user may be prompted to save or transmit the results upon selecting the close 516 button if the results have not already been saved or transmitted.

Figure 6:
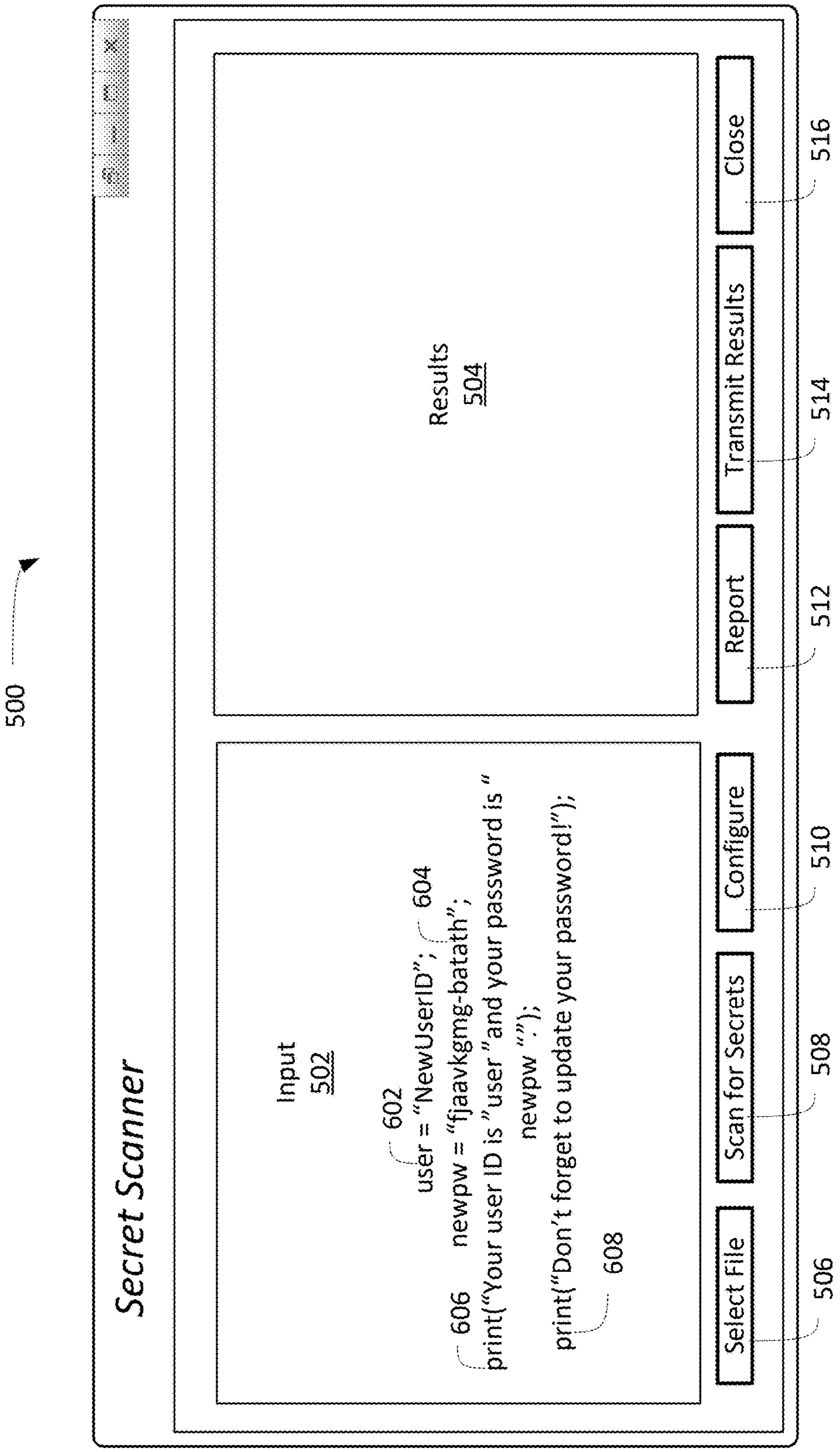
FIG. 6 depicts an example of input data entered in a user interface for a secret scanner according to some embodiments of the present invention.

FIG. 6 depicts an example of input data entered in user interface 500 for a secret scanner according to some embodiments. Input region 502 of the user interface 500 can be populated by a user system 106 of FIG. 1 typing or pasting content. Alternatively, data sources 105 of FIG. 1 can pass input through the API 110 of FIG. 1 for use by the secret scanner 114 of FIG. 1 without the use of the user interface 500. In the example of FIG. 6, the input includes multiple lines 602, 604, 606, 608 of code or pseudo-code. Upon selection of the scan for secrets 508 button, the secret scanner 114 can parse the data entered in the input region 502. For example, the secret scanner 114 may identify a key of "user" and a value of "NewUserID" as one token in line 602 and may identify a key of "newpw" and a value of "fjaavkgmg-batath" as another token in line 604. The value of the token of line 602 may have an entropy that is below an upper threshold and may result, for example, in secret analyzer 122B of FIGS. 1 and 3 determining that the value of "NewUserID" is more likely an insignificant secret exposure 316 of FIG. 3 or may fall below a lower threshold that triggers an analyst review 320 of FIG. 3. The value of the token of line 604 may be above an upper threshold, with the secret analyzer 122A of FIGS. 1 and 3 identifying the token as a significant secret exposure 304 of FIG. 3, resulting in a significant secret mitigation 306 of FIG. 3. In parsing lines 606 and 608, the text may initially be considered as potential tokens; however, these potential tokens can be filtered out as having an insufficient entropy or lack of values. For instance, in line 606, a key of "user ID" and value of "user" can be identified as a potential secret token, and a key of "password" and value of "newpw" can be identified as a potential secret token. The potential secret token values of line 606 may exhibit entropy that is too low (e.g., below a minimum threshold) or fail pattern matching as unlikely to be actual secrets, e.g., too generic or generalized. While the word "password" appears in line 608, there is no associated value provided, and thus may not be a valid token for further analysis.

It will be understood that the example of FIG. 6 is for purposes of explanation and the data input can include hundreds or thousands of lines that would extend beyond the capacity of a human reviewer to process. Further, the complexity of underlying models trained to distinguish secrets from non-secrets and significant exposure from insignificant exposure can be trained with a large volume of examples beyond the capacity of humans to process.

Figure 7:
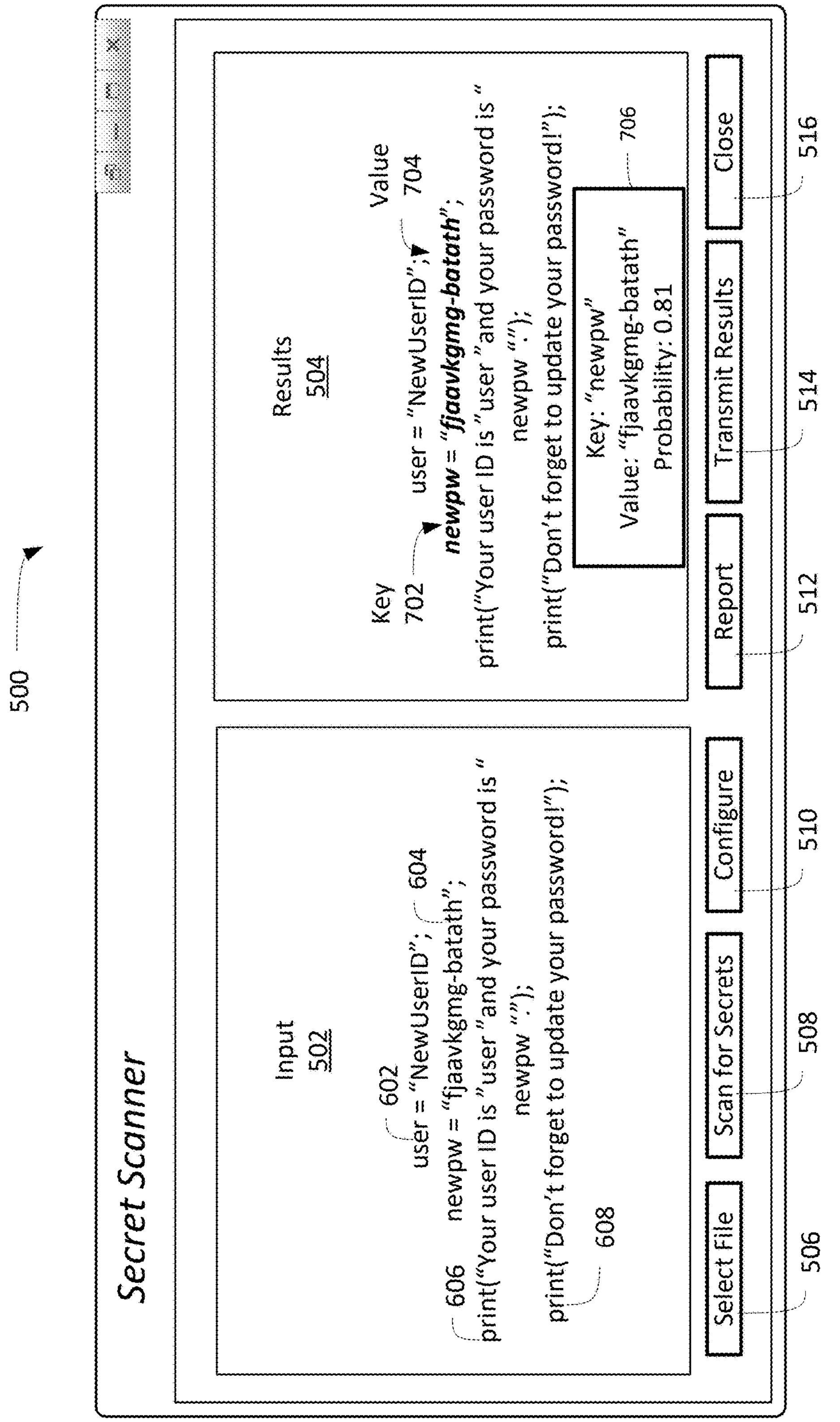
FIG. 7 depicts an example of results in a user interface for a secret scanner according to some embodiments of the present invention.

FIG. 7 depicts an example of results in user interface 500 for a secret scanner according to some embodiments. Upon processing data in input region 502, the secret scanner 114 can display results in output region 504. In this example, the token associated with line 604 may be identified as a confirmed secret. A key 702 and value 704 of the token associated with line 604 may be visually highlighted to assist in the user identifying associated context relative to other text. A summary 706 can appear as a popup or overlay that identifies each secret with an associated probability. The report 512 button can generate and/or display a report that may also indicate other potential secrets which were deemed insignificant or triggered a further review. If automated notifications are not enabled, the user can select the transmit results 514 button to send a notification to one or more systems to take further actions, such as removing the secret from a data source 105 and/or the data vault 120 of FIG. 1. In some cases, it may be determined that the detected secret was not actually a significant secret, such as training materials or example material. Where such false positives are identified, training data sets can be updated to further refine the models upon the next training revision.

It will be understood that the example of FIG. 7 is one possible output configuration and the output and reporting of secrets is not limited to the example as described. For example, the output can be a file or object returned for further processing without a graphical display of the results.

Figure 8:
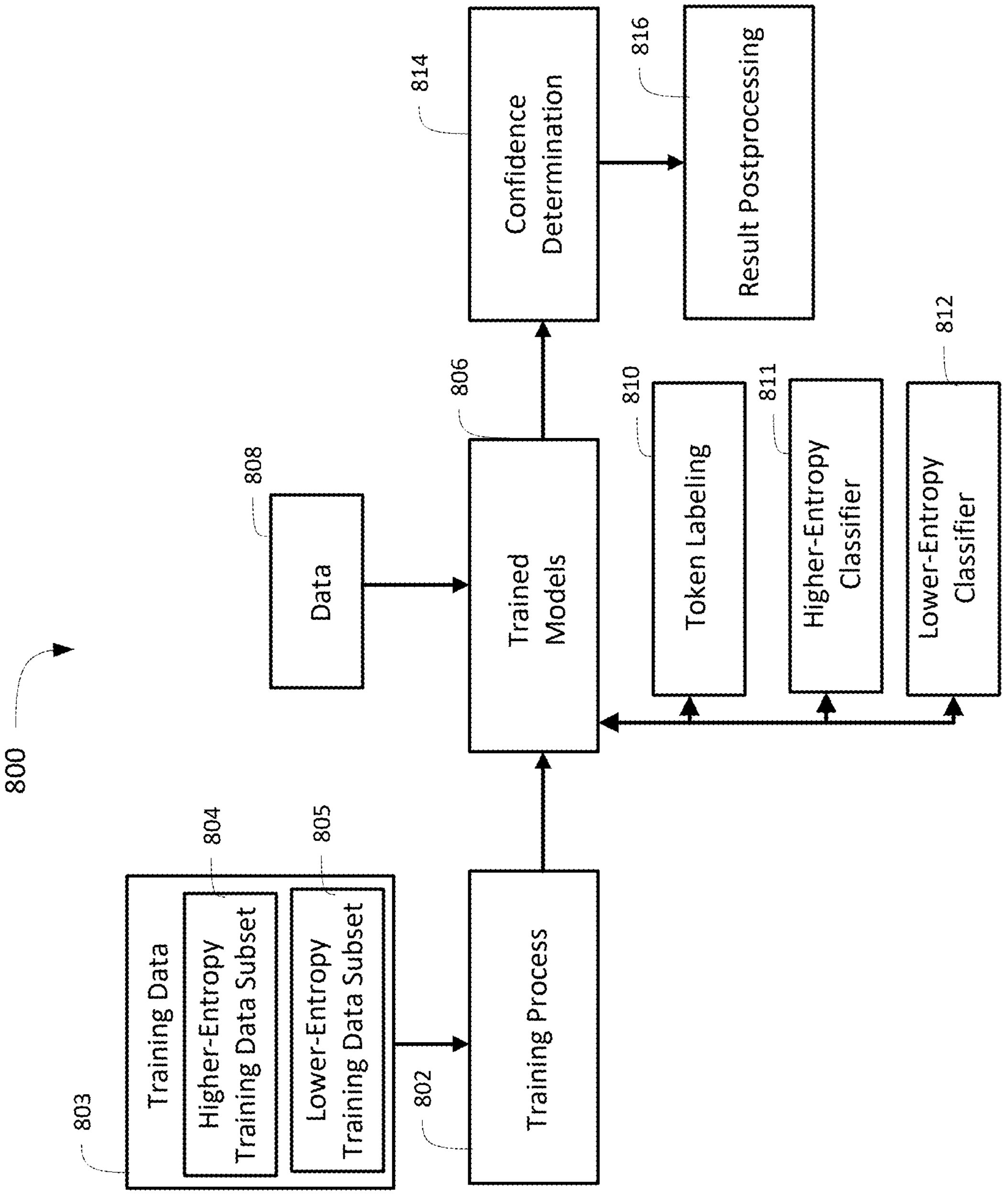
FIG. 8 depicts an example of a training and prediction process according to some embodiments of the present invention.

FIG. 8 depicts a training and prediction process 800 according to some embodiments. The training and prediction process 800 can include a training process 802 that analyzes training data 803 to develop trained models 806, such as token labeling 810, a higher-entropy classifier 811 and a lower-entropy classifier 812. The training process 802 can use labeled or unlabeled data in the training data 803 to learn features, such as a mapping of words and phrases to token keys and values, as well as differentiating potential secrets as more likely significant exposure versus insignificant exposure. The training data 803 can include a higher-entropy training data subset 804 and a lower-entropy training data subset 805 to establish a ground truth for learning coefficients/weights and other such features known in the art of machine learning to develop trained models 806. The use of training data subsets can provide more fine-tuned models for higher accuracy and lower complexity as opposed to a single model. The trained models 806 can include a family of models to identify and label tokens in data 808. The data 808 can be input through API 110 of FIG. 1 and may be in the form of files or objects and may include text entered through input region 502 of FIG. 5. The trained models 806 can include token labeling 810 to parse the data 808 for entropy analysis and classification. The higher-entropy classifier 811 can be invoked by secret analyzer 122A of FIGS. 1 and 3 to distinguish between significant secret exposure 304 and insignificant secret exposure 308 as trained using the higher-entropy training data subset 804. The lower-entropy classifier 812 can be invoked by secret analyzer 122B of FIGS. 1 and 3 to distinguish between significant secret exposure 312 and insignificant secret exposure 316 as trained using the lower-entropy training data subset 805. Training data 803 can be labeled to identify the higher-entropy training data subset 804 and lower-entropy training data subset 805. In some aspects, a first portion of the higher-entropy training data subset 804 and lower-entropy training data subset 805 can be used for training, and a second portion can be used for testing to verify that the training produces a sufficiently high level of accuracy. As one example, about 90% of the training data 803 may be used for training and about 10% of the training data 803 may be used for testing. A sufficiently high level of accuracy can be, for example, between about 70% and about 90%; however, other training thresholds can be used depending on the available amount of training data 803 and desired confidence in the output.

The trained models 806 can output a confidence determination 814 indicating a confidence level of classification predictions of the higher-entropy classifier 811 and the lower-entropy classifier 812. Where the confidence level of the classification predictions of the higher-entropy classifier 811 is below a confidence threshold to distinguish between significant secret exposure 304 and insignificant secret exposure 308, the result postprocessing 816 may flag the results in an execution log for further review to determine whether the higher-entropy training data subset 804 should be updated. Similarly, where the confidence level of the classification predictions of the lower-entropy classifier 812 is below a confidence threshold to distinguish between significant secret exposure 312 and insignificant secret exposure 316, the result postprocessing 816 may flag the results in an execution log for further review to determine whether the lower-entropy training data subset 805 should be updated. It will be understood that the training and prediction process 800 can be performed by any portion of the system 100 of FIG. 1 and/or may be performed by another server (not depicted) which may be accessible by the system 100.

Figure 9:
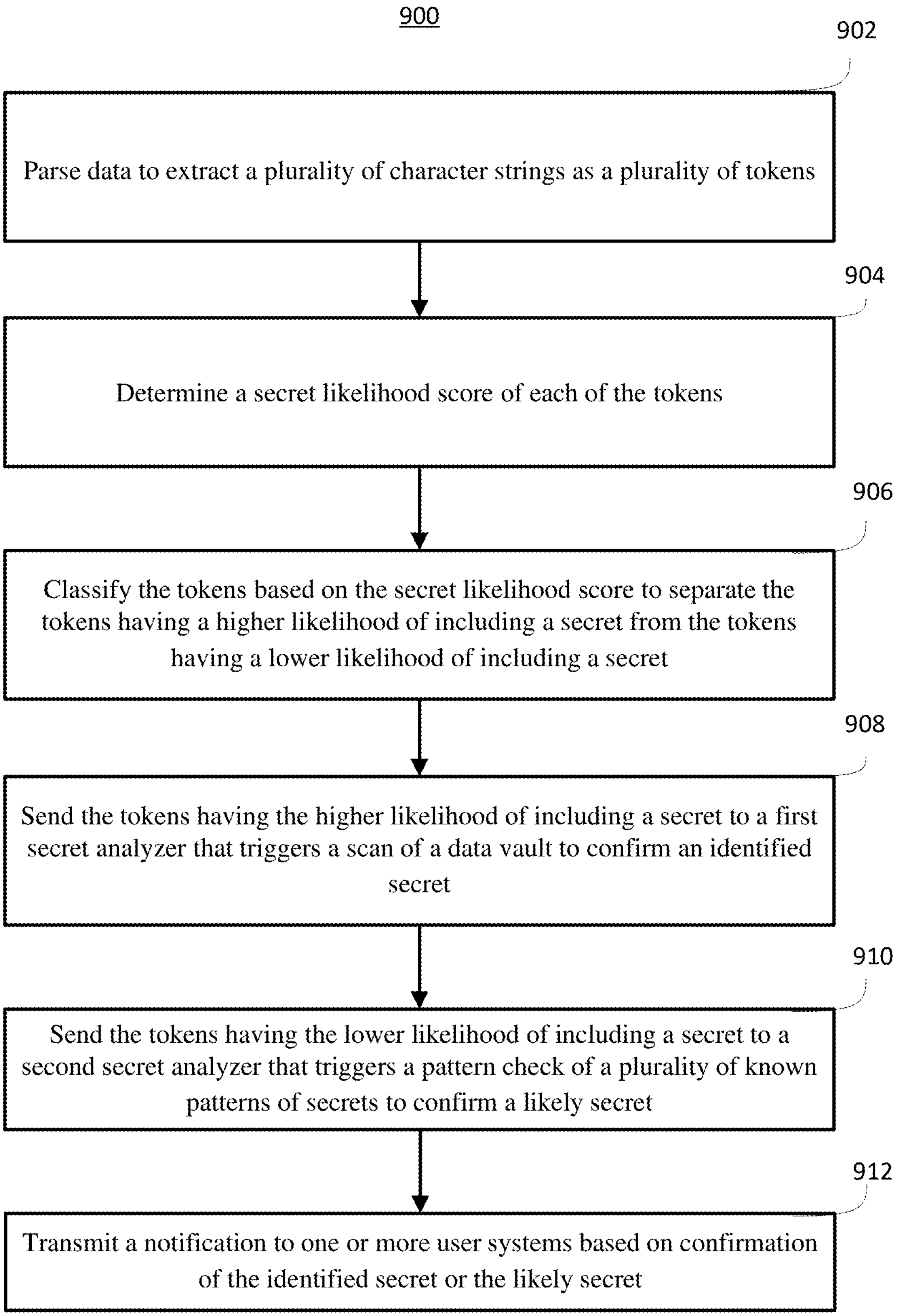
FIG. 9 depicts a secret scanner process according to some embodiments of the present invention.

Turning now to FIG. 9, a process flow 900 of a secret scanner is depicted according to an embodiment. The process flow 900 includes a number of steps that may be performed in the depicted sequence or in an alternate sequence. The process flow 900 may be performed by the system 100 of FIG. 1. The process flow 900 is described in reference to FIGS. 1-9.

At step 902, data, such as data 808, is parsed to extract a plurality of character strings as a plurality of tokens. Labeling of the tokens can be performed by a machine learning process. For example, the token labeling 810 can parse data 808 as part of a preprocessing and conditioning step performed by the secret scanner 114 or by a separate process. Data 808 can be from one or more of the data sources 105 or input/selected through one or more user systems 106. The one or more data sources 105 can include, for example, one or more of: a code repository, a database, a registry, and a cloud object storage service.

At step 904, the system 100 can determine a secret likelihood score of each of the tokens. The secret likelihood score of the tokens can be determined based on an entropy determination that labels the tokens with an entropy value as the secret likelihood score. The entropy determination can indicate an amount of randomness of the character strings.

At step 906, the system 100 can classify the tokens based on the secret likelihood score to separate the tokens having a higher likelihood of including a secret from the tokens having a lower likelihood of including a secret. The tokens can be sorted based on the secret likelihood score of the tokens. One or more of the tokens having the secret likelihood score below a minimum threshold can be discarded.

At step 908, the system 100 can send the tokens having the higher likelihood of including a secret to a first secret analyzer that triggers a scan of a data vault 120 to confirm an identified secret. The first secret analyzer (e.g., secret analyzer 122A) can comprise a first large language model trained based on a first training data subset (e.g., higher-entropy training data subset 804) to group secrets as an insignificant secret exposure 308 and a significant secret exposure 304, for instance, using higher-entropy classifier 811.

At step 910, the system 100 can send the tokens having the lower likelihood of including a secret to a second secret analyzer that triggers a pattern check of a plurality of known patterns of secrets to confirm a likely secret. The second secret analyzer (e.g., secret analyzer 122B) can comprise a second large language model trained based on a second training data subset (e.g., lower-entropy training data subset 805) to group secrets as an insignificant secret exposure 316 and a significant secret exposure 312, for instance, using lower-entropy classifier 812. The pattern check of the second secret analyzer can include checking for an access key format, e.g., (AKIAxxxxxxxxxxxxxxxxxxxx). As a further example, the pattern check of the second secret analyzer can include checking for a variable name containing a key, a token, an identifier, or a password abbreviation (e.g., containing "key", "token", "id", "pw", "pwd", etc.). Further, the pattern check of the second secret analyzer can include checking for a mixture of uppercase letters, lowercase letters, numbers, and symbols. As another example, the pattern check of the second secret analyzer can include checking for a context switch including a ratio of changes between four character types to a length of the character strings. In some embodiments, the second secret analyzer can scan the data vault 120 to confirm the likely secret, for instance, in addition to performing the pattern check.

At step 912, the system 100 can transmit a notification to one or more user systems 106 based on confirmation of the identified secret or the likely secret. The notification to the one or more user systems 106 based on confirmation of the identified secret can be performed based on the first large language model identifying the confirmed secret as the significant secret exposure 304. The notification to the one or more user systems 106 based on confirmation of the likely secret can be performed based on the second large language model identifying the likely secret as the significant secret exposure 312, and, in some embodiments, detecting the likely secret in the data vault 120 in response to scanning the data vault 120.

In some embodiments, classifying tokens based on the secret likelihood score to separate the tokens further can include classifying the tokens with a lowest likelihood of including a secret as the tokens having less than the lower likelihood of including a secret and more than a minimum threshold.

In some embodiments, the tokens having the lowest likelihood of including a secret can be sent to a third secret analyzer (e.g., trigger analyst review 320) that triggers a notification to a reviewer to determine whether a significant secret exposure, an insignificant secret exposure, or no secret exposure exists.

In some embodiments, one or more likelihood thresholds can be defined between the lower likelihood and the higher likelihood, and the tokens can be sorted between three or more levels of likelihood each having a different amount of utilization of the processor resources, such as processor resources 108.

In some embodiments, a computer program product can include a storage medium embodied with computer program instructions that when executed by a computer cause the computer to implement: parsing data 808 to extract a plurality of character strings as a plurality of tokens, determining a secret likelihood score of each of the tokens, classifying the tokens based on the secret likelihood score to separate the tokens having a higher likelihood of including a secret from the tokens having a lower likelihood of including a secret, sending the tokens having the higher likelihood of including a secret to a first secret analyzer that triggers a scan of a data vault 120 to confirm an identified secret, sending the tokens having the lower likelihood of including a secret to a second secret analyzer that triggers a pattern check of a plurality of known patterns of secrets to confirm a likely secret, and transmitting a notification to one or more user systems 106 based on confirmation of the identified secret or the likely secret.

In some embodiments, the first secret analyzer can include a first large language model trained based on a first training data subset to group secrets as an insignificant secret exposure and a significant secret exposure, and the notification to the one or more user systems 106 based on confirmation of the identified secret can be performed based on the first large language model identifying the confirmed secret as the significant secret exposure.

In some embodiments, the second secret analyzer can include a second large language model trained based on a second training data subset to group secrets as the insignificant secret exposure and the significant secret exposure. In some embodiments, the second secret analyzer can scan of the data vault 120 to confirm the likely secret. The notification can be provided to the one or more user systems 106 based on confirmation of the likely secret can be performed based on the second large language model identifying the likely secret as the significant secret exposure, and in some embodiments, detecting the likely secret in the data vault 120.

Technical effects include enhanced computer system security. Identifying secrets and discerning between the potential significance of secrets can focus resources on determining whether potential security risks may exist through exposing secrets that could be used, for example, to gain unauthorized access to secure systems. The volume of data and variations in secret data format may prevent human users from successfully identifying many types of secret data through manual inspection. The use of machine learning and large language models can continue to enhance system performance as training data sets are updated to increase accuracy as a large volume of data is analyzed.

Example uses can include analysis of various file types that may include identifiers and passwords, encryption key sharing, private key passwords, certificate sharing, server credentials, storage request credentials, and other such uses. Further, a user interface can allow users to test smaller text snippets in a free-form format that may not be supported by systems that require adherence to a specific programming language format and strict rules, for example. The use of an API can allow many different data sources to be tested in an automated manner for rapid analysis of data sets bypassing direct entry through a user interface if desired. Further, customizations can allow for various testing scenarios to determine sensitivity of secret analysis, detection, and classification.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages, as well as Python, macro-based languages, and the like. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G, 4G, 5G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:

an application programming interface configured to receive a plurality of data from one or more data sources;

a plurality of memory resources; and a plurality of processor resources configured to access the memory resources and execute a plurality of instructions to perform a plurality of operations that:

parse the data to extract a plurality of character strings as a plurality of tokens;

determine a secret likelihood score of each of the tokens, the secret likelihood score indicating a likelihood that the character strings within the tokens include a secret;

classify the tokens based on the secret likelihood score to separate the tokens having a higher likelihood of including a secret from the tokens having a lower likelihood of including a secret;

send the tokens having the higher likelihood of including a secret to a first secret analyzer that triggers a scan of a data vault to confirm an identified secret;

send the tokens having the lower likelihood of including a secret to a second secret analyzer that triggers a pattern check of a plurality of known patterns of secrets to confirm a likely secret; and transmit a notification to one or more user systems based on confirmation of the identified secret or the likely secret.

2. The system of claim 1, wherein the secret likelihood score of the tokens is determined based on an entropy determination that labels the tokens with an entropy value as the secret likelihood score.

3. The system of claim 2, wherein the entropy determination indicates an amount of randomness of the character strings.

4. The system of claim 2, wherein labeling of the tokens is performed by a machine learning process.

5. The system of claim 1, wherein the one or more data sources comprise one or more of: a code repository, a database, a registry, and a cloud object storage service.

6. The system of claim 1, wherein the instructions are further configured to perform a plurality of operations that:

sort the tokens based on the secret likelihood score of the tokens; and discard one or more of the tokens having the secret likelihood score below a minimum threshold.

7. The system of claim 1, wherein the first secret analyzer comprises a first large language model trained based on a first training data subset to group secrets as an insignificant secret exposure and a significant secret exposure.

8. The system of claim 7, wherein the notification to the one or more user systems based on confirmation of the identified secret is performed based on the first large language model identifying the confirmed secret as the significant secret exposure.

9. The system of claim 7, wherein the second secret analyzer comprises a second large language model trained based on a second training data subset to group secrets as the insignificant secret exposure and the significant secret exposure.

10. The system of claim 9, wherein the second secret analyzer further triggers a scan of the data vault to confirm the likely secret, wherein the notification to the one or more user systems based on confirmation of the likely secret is performed based on the second large language model identifying the likely secret as the significant secret exposure and detecting the likely secret in the data vault.

11. The system of claim 1, wherein the pattern check of the second secret analyzer comprises checking for an access key format.

12. The system of claim 1, wherein the pattern check of the second secret analyzer comprises checking for a variable name containing a key, a token, an identifier, or a password abbreviation.

13. The system of claim 1, wherein the pattern check of the second secret analyzer comprises checking for a mixture of uppercase letters, lowercase letters, numbers, and symbols.

14. The system of claim 1, wherein the pattern check of the second secret analyzer comprises checking for a context switch comprising a ratio of changes between four character types to a length of the character strings.

15. The system of claim 1, wherein classifying the tokens based on the secret likelihood score to separate the tokens further comprises classifying the tokens with a lowest likelihood of including a secret as the tokens having less than the lower likelihood of including a secret and more than a minimum threshold.

16. The system of claim 15, wherein the instructions are further configured to perform a plurality of operations that:

send the tokens having the lowest likelihood of including a secret to a third secret analyzer that triggers a notification to a reviewer to determine whether a significant secret exposure, an insignificant secret exposure, or no secret exposure exists.

17. The system of claim 1, wherein one or more likelihood thresholds are defined between the lower likelihood and the higher likelihood, and the tokens are sorted between three or more levels of likelihood, each having a different amount of utilization of the processor resources.

18. A computer program product comprising a non-transitory storage medium embodied with computer program instructions that when executed by a computer cause the computer to implement:

parsing data to extract a plurality of character strings as a plurality of tokens;

determining a secret likelihood score of each of the tokens, the secret likelihood score indicating a likelihood that the character strings within the tokens include a secret;

classifying the tokens based on the secret likelihood score to separate the tokens having a higher likelihood of including a secret from the tokens having a lower likelihood of including a secret;

sending the tokens having the higher likelihood of including a secret to a first secret analyzer that triggers a scan of a data vault to confirm an identified secret;

sending the tokens having the lower likelihood of including a secret to a second secret analyzer that triggers a pattern check of a plurality of known patterns of secrets to confirm a likely secret; and transmitting a notification to one or more user systems based on confirmation of the identified secret or the likely secret.

19. The computer program product of claim 18, wherein the secret likelihood score of the tokens is determined based on an entropy determination that labels the tokens with an entropy value as the secret likelihood score.

20. The computer program product of claim 19, wherein the entropy determination indicates an amount of randomness of the character strings.

21. The computer program product of claim 19, wherein labeling of the tokens is performed by a machine learning process.

22. The computer program product of claim 18, further comprising computer program instructions that when executed by the computer cause the computer to implement:

sorting the tokens based on the secret likelihood score of the tokens; and discarding one or more of the tokens having the secret likelihood score below a minimum threshold.

23. The computer program product of claim 18, wherein the first secret analyzer comprises a first large language model trained based on a first training data subset to group secrets as an insignificant secret exposure and a significant secret exposure, and the notification to the one or more user systems based on confirmation of the identified secret is performed based on the first large language model identifying the confirmed secret as the significant secret exposure.

24. The computer program product of claim 23, wherein the second secret analyzer further triggers a scan of the data vault to confirm the likely secret, wherein the second secret analyzer comprises a second large language model trained based on a second training data subset to group secrets as the insignificant secret exposure and the significant secret exposure, and the notification to the one or more user systems based on confirmation of the likely secret is performed based on the second large language model identifying the likely secret as the significant secret exposure and detecting the likely secret in the data vault.

25. The computer program product of claim 18, wherein the pattern check of the second secret analyzer comprises checking for an access key format, a variable name containing a key, a token, an identifier, or a password abbreviation.

26. The computer program product of claim 25, wherein the pattern check of the second secret analyzer comprises checking for a mixture of uppercase letters, lowercase letters, numbers, and symbols, and checking for a context switch comprising a ratio of changes between four character types to a length of the character strings.

* * * * *